United States Patent
Cui et al.

(10) Patent No.: US 7,675,641 B2
(45) Date of Patent: Mar. 9, 2010

(54) METHOD AND DEVICE FOR CONVERTING SCANNED TEXT TO AUDIO DATA VIA CONNECTION LINES AND LOOKUP TABLES

(75) Inventors: Chengwu Cui, Lexington, KY (US); Stuart Willard Daniel, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1213 days.

(21) Appl. No.: 10/975,653

(22) Filed: Oct. 28, 2004

(65) Prior Publication Data

US 2006/0092480 A1    May 4, 2006

(51) Int. Cl.
G06F 3/12    (2006.01)
H04N 1/04    (2006.01)
H04N 1/40    (2006.01)
G06K 9/72    (2006.01)

(52) U.S. Cl. ............... 358/1.15; 358/474; 358/462; 382/229

(58) Field of Classification Search ............... 358/1.15
See application file for complete search history.

(56) References Cited

U.S. PATENT DOCUMENTS

| | | | |
|---|---|---|---|
| 4,996,707 A * | 2/1991 | O'Malley et al. | 379/100.13 |
| 5,278,918 A * | 1/1994 | Bernzott et al. | 382/176 |
| 5,715,370 A | 2/1998 | Luther et al. | |
| 5,850,629 A | 12/1998 | Holm et al. | |
| 5,898,423 A | 4/1999 | Tognazzini et al. | |
| 6,052,663 A * | 4/2000 | Kurzweil et al. | 704/260 |
| 6,076,060 A | 6/2000 | Lin et al. | |
| 6,115,482 A | 9/2000 | Sears et al. | |
| 6,185,329 B1 | 2/2001 | Zhang et al. | |
| 6,218,964 B1 | 4/2001 | Ellis | |
| 6,289,304 B1 | 9/2001 | Grefenstette | |
| 6,615,173 B1 | 9/2003 | Celi, Jr. | |
| 6,917,438 B1 * | 7/2005 | Yoda et al. | 358/1.15 |
| 7,391,527 B2 * | 6/2008 | Irwin et al. | 358/1.15 |
| 2003/0059088 A1 | 3/2003 | Culp et al. | |
| 2003/0163316 A1 | 8/2003 | Addison et al. | |
| 2003/0195749 A1 | 10/2003 | Schuller | |
| 2004/0006467 A1 * | 1/2004 | Anisimovich et al. | 704/251 |
| 2004/0088165 A1 * | 5/2004 | Okutani et al. | 704/260 |
| 2005/0197825 A1 * | 9/2005 | Hagerman et al. | 704/2 |
| 2007/0211148 A1 * | 9/2007 | Lev et al. | 348/207.99 |

* cited by examiner

Primary Examiner—Twyler L Haskins
Assistant Examiner—Fred Guillermety

(57) ABSTRACT

Methods and devices for converting printed media into audio data. In one embodiment, a device includes a scanning platform for supporting the document to be scanned, a scanning mechanism for converting images on the document into image data, and a processor configured to convert the scanned image data into audio data. The device may further include printer components configured to create a hardcopy of the image data, an audio device such as a speaker, and an interface for outputting the image data or audio data.

6 Claims, 10 Drawing Sheets

METHOD AND DEVICE FOR CONVERTING SCANNED TEXT TO AUDIO DATA VIA CONNECTION LINES AND LOOKUP TABLES

FIELD OF THE INVENTION

Embodiments of the invention relate to methods and devices for creating an audio file from a scanned image.

BACKGROUND OF THE INVENTION

Scanners are traditionally used to obtain an image or graphical representation of a document, picture, or other form of printed media. Scanners may be stand-alone devices that only provide scanning functionality or may be combined with a printer, facsimile machine, and the like in a multifunction peripheral that provides scanning, printing, copying, and faxing functionality. At present, the scanners that are known in the art, whether performing as a stand alone device or as one function of a multi-function peripheral, are limited to capturing and manipulating image data.

SUMMARY OF THE INVENTION

Scanners typically create an electronic image copy of printed media that can be transmitted to a display device or workstation for viewing and/or manipulation, or to a printer for the creation of a hard copy. It may be beneficial, however, to create alternative formats of the scanned media, such as an audio copy. The audio copy could be played for a user over a speaker or transmitted and played, modified, and/or stored on a workstation or other memory device. Visually impaired users may feed one or more pages of printed media containing text to a scanner that generates corresponding audio data as it scans. The user may then listen to an audio rendition of the text contained on the pages. Using an automatic scanner that generates audio data instead of a similar manual scanner would also eliminate the need for visually impaired users to manually scan the document, which may be challenging given the users' limited sight.

Accordingly, there is a need for automatic scanners that allow a user to create other formats of scanned media, such as an audio copy that can be transmitted over a network, stored for future reference, or immediately played back to a user.

Certain embodiments of the invention provide a peripheral that includes a scanning platform for supporting a document to be scanned, a scanning mechanism for converting images on the document into image data, and a processor configured to convert the scanned image data into audio data. The peripheral may further include printer components configured to create a hardcopy of the image data, an audio device such as a speaker, and an interface for outputting the image data or audio data.

Additional embodiments provide a method for converting a hardcopy document to audio data. The method may include the steps of providing the hardcopy document to a peripheral with a scanning platform for supporting the hardcopy document; obtaining, at the peripheral, image data of the document; processing, at the peripheral, the image data to create audio data; and transmitting the audio data from the peripheral to a target device.

Another embodiment provides a system for converting a hardcopy document to audio data. The system may include a peripheral with a scanning platform for supporting the hardcopy document and configured to obtain image data of the hardcopy document, to process the image data and create audio data, and to output the audio data; a client computer configured to receive the audio data from the peripheral and store the audio data; and a network to connect the peripheral and the client computer and transmit the audio data.

Yet another embodiment provides a printing apparatus that includes an interface configured to receive print data; printer components configured to output the print data; a processor configured to convert the print data to audio data; and an audio device to output the audio data.

Additional embodiments provide a computer-readable medium containing instructions for converting a hardcopy document into audio data. The computer-readable medium may include instructions for controlling feeding of the document; obtaining image data of the hardcopy document by the image capturing apparatus; and converting the image data into audio data by the image capturing apparatus.

Another embodiment provides a computer-readable medium containing instructions of converting a hardcopy document into audio data. The computer-readable medium may contain instructions for obtaining image data of the hardcopy document supported by a scanning platform of an image capturing apparatus; and converting the image data into audio data by the image capturing apparatus.

Other features and advantages of embodiments of the invention will become apparent to those skilled in the art upon review of the following detailed description and drawings.

Figure 1:
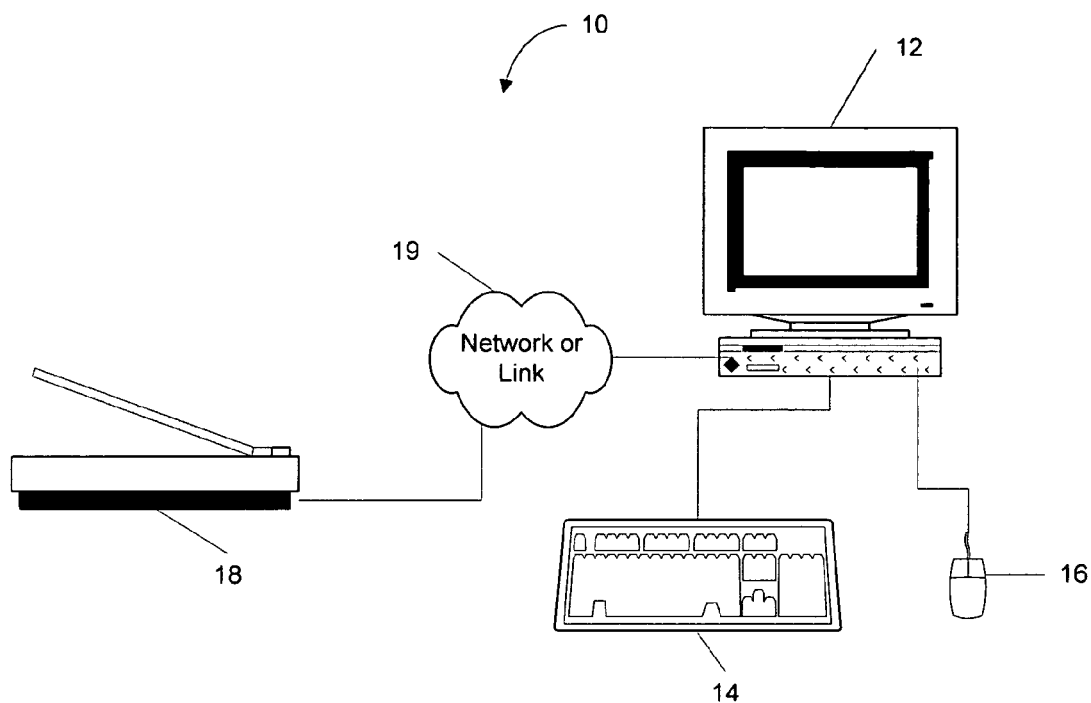
FIG. 1 is an illustration of an exemplary computer system including a workstation and a connected peripheral.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

FIG. 1 illustrates an exemplary computer system 10. The system 10 includes an exemplary host computer or workstation 12 having a keyboard 14 and a cursor control device 16, which is shown in the form of a mouse. The workstation 12 is also connected to an image capture device 18 (shown as a flatbed scanner) through a network or link 19. In some embodiments, the scanner 18 is a multifunction peripheral that provides additional functionality such as printing, copying, and faxing. The scanner 18 may also be a stand-alone device and may not be connected to a workstation, network, or other device. As should also be apparent, the system 10 could be configured to include multiple workstations, scanners, and other devices not shown. Routers, switches, or network connections allowing the scanner and possibly other components to communicate with multiple workstations could also be included. In addition, the various connections between elements of the system 10, including the network 19, could include both wired and wireless connections as well as local area network and wide area network connections.

Figure 2:
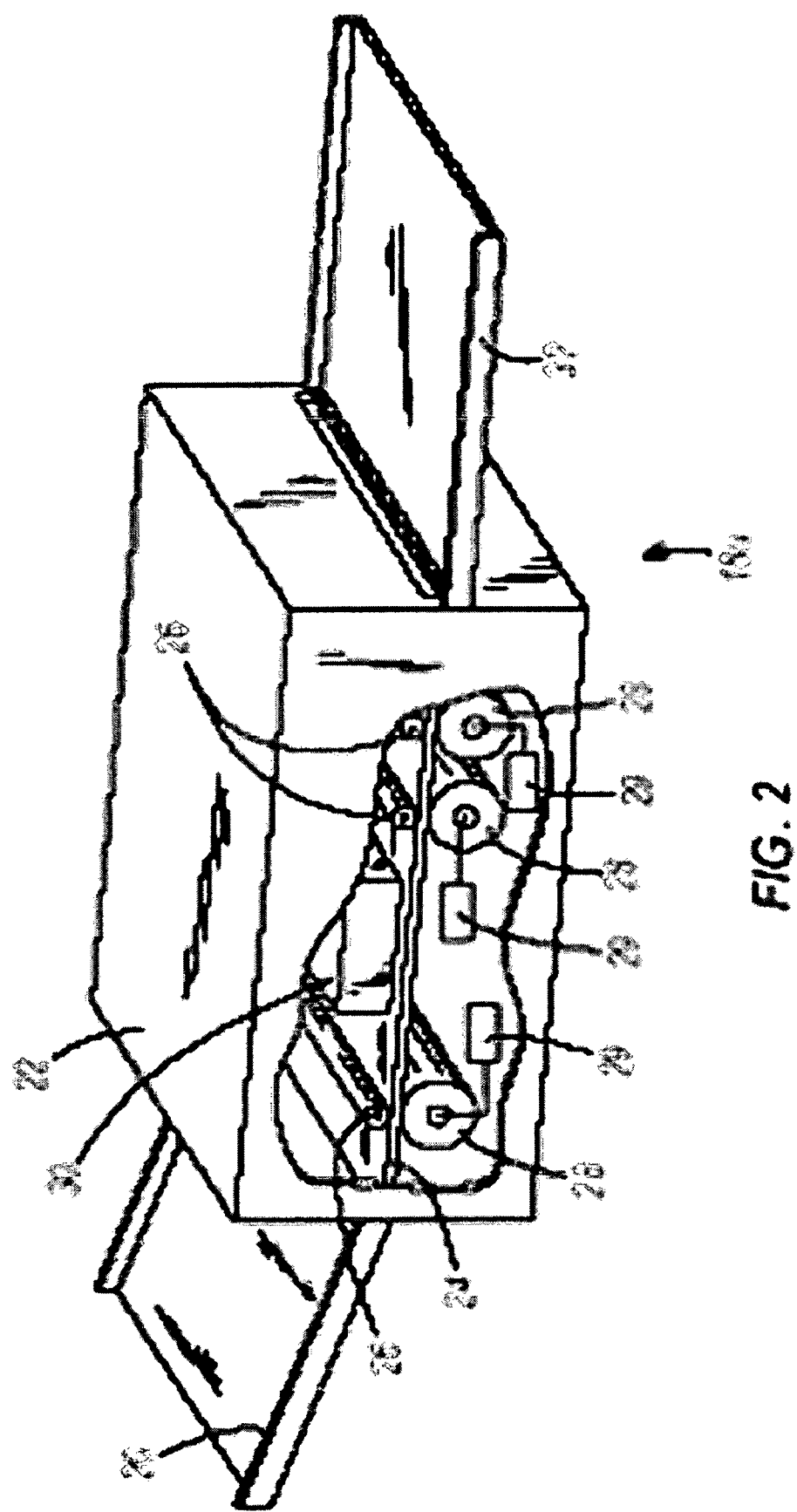
FIG. 2 illustrates an exemplary scanner.

FIG. 2 illustrates an exemplary scanner 18a. The scanner 18a has an input tray 20, a housing 22, a printed media travel path 24, one or more top feedrollers 26, one or more bottom feedrollers 28, one or more motors 29, a scanning mechanism 30, and an output tray 32. The input tray 20 holds printed media to be fed into the scanner 18a. The housing 22 encloses the components of the scanner 18a and helps keep dust or debris from damaging or obstructing the components thereof. The housing 22 also helps protect a user from moving parts of the scanner 18a or light and/or side effects created by the scanner 18a. The printed media is supported and moved through the scanner 18a along the printed media travel path 24 by the top feedrollers 26 and bottom feedrollers 28. In some embodiments, the motors 29 rotate the top feedrollers 26 in the opposite direction as the bottom feedrollers 28, which subsequently moves the printed media, located between the top feedrollers 26 and bottom feedrollers 28. The printed media is fed into the scanner 18 from the input tray 20, moved along the printed media travel path 24 past the scanning mechanism, and finally output to the output tray 32.

The scanning mechanism 30 may be a charged-coupled device ("CCD") device or contact-image sensor ("CIS") containing an array of light sensitive diodes that convert sensed light rays into electrical signals. The scanning mechanism 30 may also include one or more light emitting devices ("LEDs") configured to direct light at the printed media. The scanning mechanism 30 creates image data from light generated by the LEDs and reflected by the printed media. The electronic image data can be used by the workstation 12, printer, fax machine, and the like to display, print, or transmit an image of the printed media.

After the scanning mechanism 30 obtains image data of the printed media traveling through the printed media travel path 24, the top and bottom feedrollers 26 and 28 direct the printed media out of the scanner 18a and into the output tray 32. The output tray 32 collects the printed media after being scanned.

Figure 3:
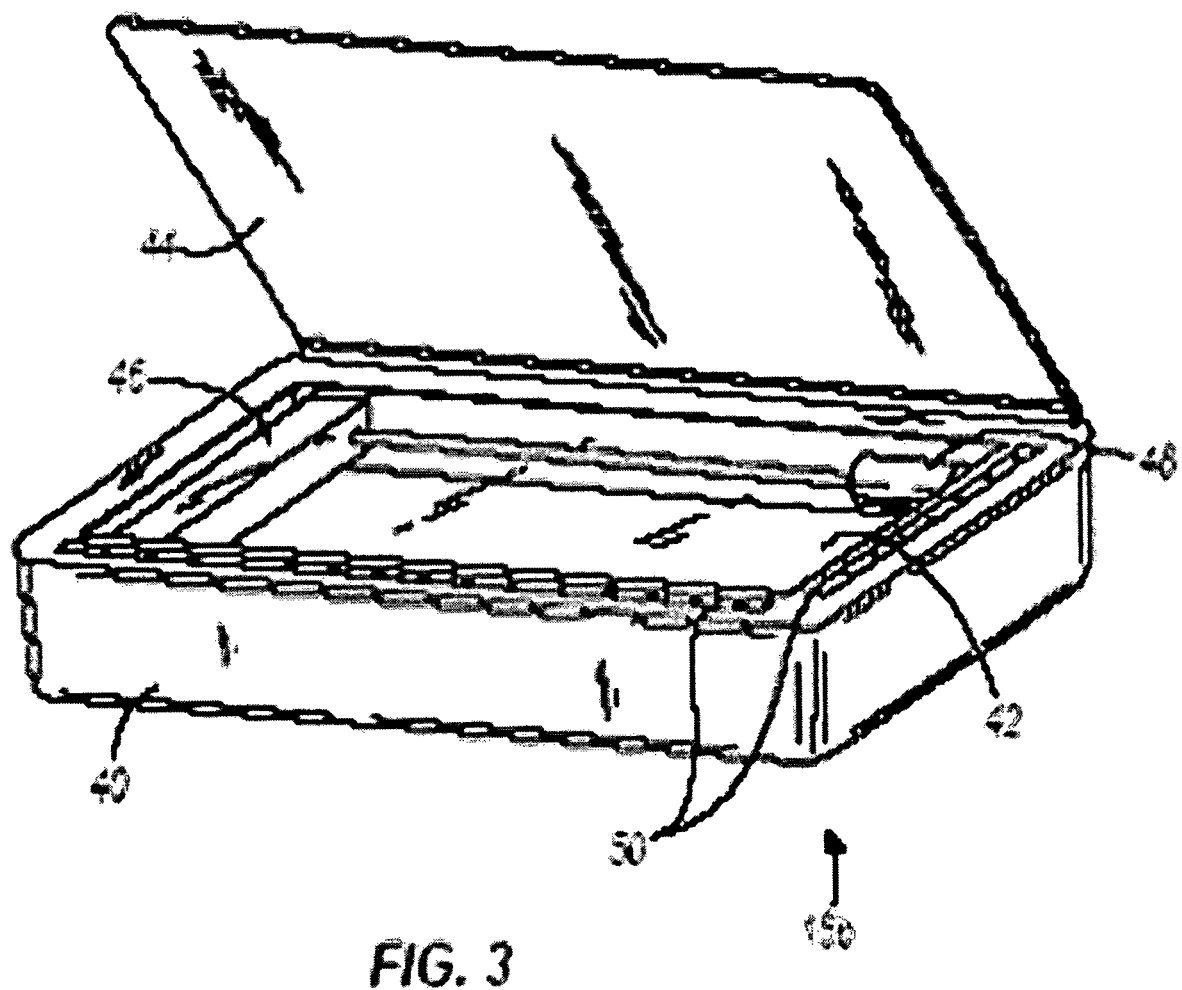
FIG. 3 illustrates another exemplary scanner.

FIG. 3 illustrates another exemplary scanner 18b. The scanner 18b includes a housing 40, a platen 42, a cover 44, a scanning mechanism 46, and a motor 48. The scanner 18b may also optionally include one or more document placement references 50. As described for the scanner 18a illustrated in FIG. 2, the housing 40 and the cover 44 of the scanner 18b helps protect the scanner components from dust, debris, and damage and helps protect a user from the moving parts, electrical connections, and light generated by the scanner components. The platen 42, constructed from glass or another transparent material, supports the printed media. A user places the printed media on the platen 42 and may use the document placement references 50 to place the printed media in a precise location. After placing the printed media on the platen 42, the user closes the cover 44 and initiates scanning. During scanning the motor 48 moves the scanning mechanism 30 beneath the platen 42 that supports the placed printed media.

As described above, the scanning mechanism 46 may be a CCD or CIS device and may also include one or more LEDs configured to generate light. The generated light is directed at the printed media through the platen 42, and the scanning mechanism 46 obtains the light reflected by the printed media through the platen 42.

It should be noted that the scanners 18a and 18b illustrated in FIGS. 2 and 3 may include additional components such as displays, touchscreens, selection buttons or switches, power inputs, output or input interfaces for connecting to the workstation 12, the network 19, or another device such as a printer, a modem, and the like.

Figure 4:
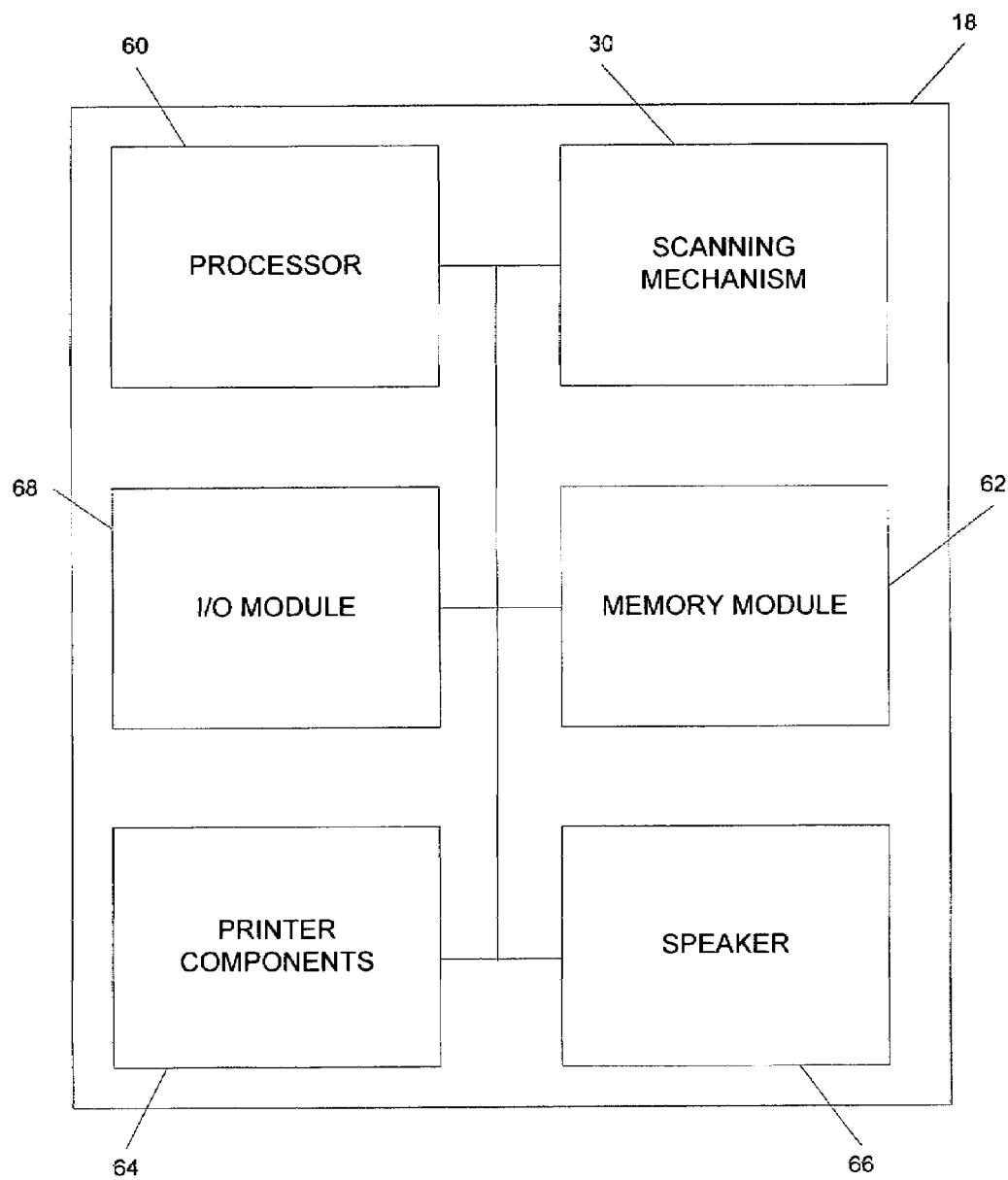
FIG. 4 is a schematic diagram of exemplary hardware inside one of the scanners shown in FIGS. 2 and 3.

FIG. 4 illustrates exemplary hardware contained in the scanners 18a and 18b shown in FIGS. 2 and 3. In addition to the scanning mechanism 30, the scanners 18a and 18b may include a processor 60, a memory module 62, printer components 64, a speaker 66, and an input/output ("I/O") module 68. The processor 60 may be a microprocessor, a programmable logic controller, an application specific integrated circuit, or the like configured to receive input and generate output. The memory module 62 may contain non-volatile memory such as one or more forms of ROM, one or more disk drives, RAM, other memory, or combinations of the foregoing. In some embodiments, the memory module 62 may contain program code or instructions executable by the processor 60.

The I/O module 68 may provide and manage one or more input and/or output interfaces that the scanners 18a and 18b use to send and/or receive instructions and data to and/or from a workstation 12 or another device either directly connected or connected over the network 19. In some embodiments, the I/O module 68 may contain a modem that is capable of connecting to a telephone network. The I/O module 68 may also contain a removable storage drive such as a compact disc writer or a memory card reader. Alternately, the I/O module 68 may provide an interface capable of accessing such devices such as a Universal Serial Bus (USB) interface. In still other embodiments, the scanners 18a and 18b may be stand-alone devices and may not be connectable to a workstation 12 or other device either directly or through the network 19. Stand-alone scanners, therefore, may not contain the I/O module 68.

The printer components 64 may include a printhead, ink reservoirs, nozzles, dryers, sensors, and the like, configured to direct print material, such as ink, onto print media to generate a hard copy. The scanners 18a and 18b may be configured to print hardcopies of image data they generate during scanning or may receive individual printing requests from a connected workstation 12 or other device. In some embodiments, the scanners 18a and 18b are configured to receive a print request including print data from a connected device, generate a hardcopy from the print data, scan the hard copy to obtain image data, and generate audio data from the image data. The scanners 18a and 18b may also not provide printing functionality, and therefore, may not include the printer components 64.

The speaker or audio device 66 may be used to play audio data generated by the scanners 18a and 18b from the obtained image data. The speaker 66 may receive the signals generated by the processor 60 or the scanning mechanism 30. Alternatively, audio data may be transmitted to a connected workstation 12 or similar device configured to play audio data over a speaker. In other embodiments, the I/O module 68 may contain a modem capable of dialing a phone number and then playing back the audio data over the telephone network upon recognizing a receiver pickup signal.

It should be apparent that the scanners 18a and 18b may include additional hardware components and that the functionality provided by the exemplary components illustrated in FIG. 4 may be combined and configured in a variety of ways.

Figure 5:
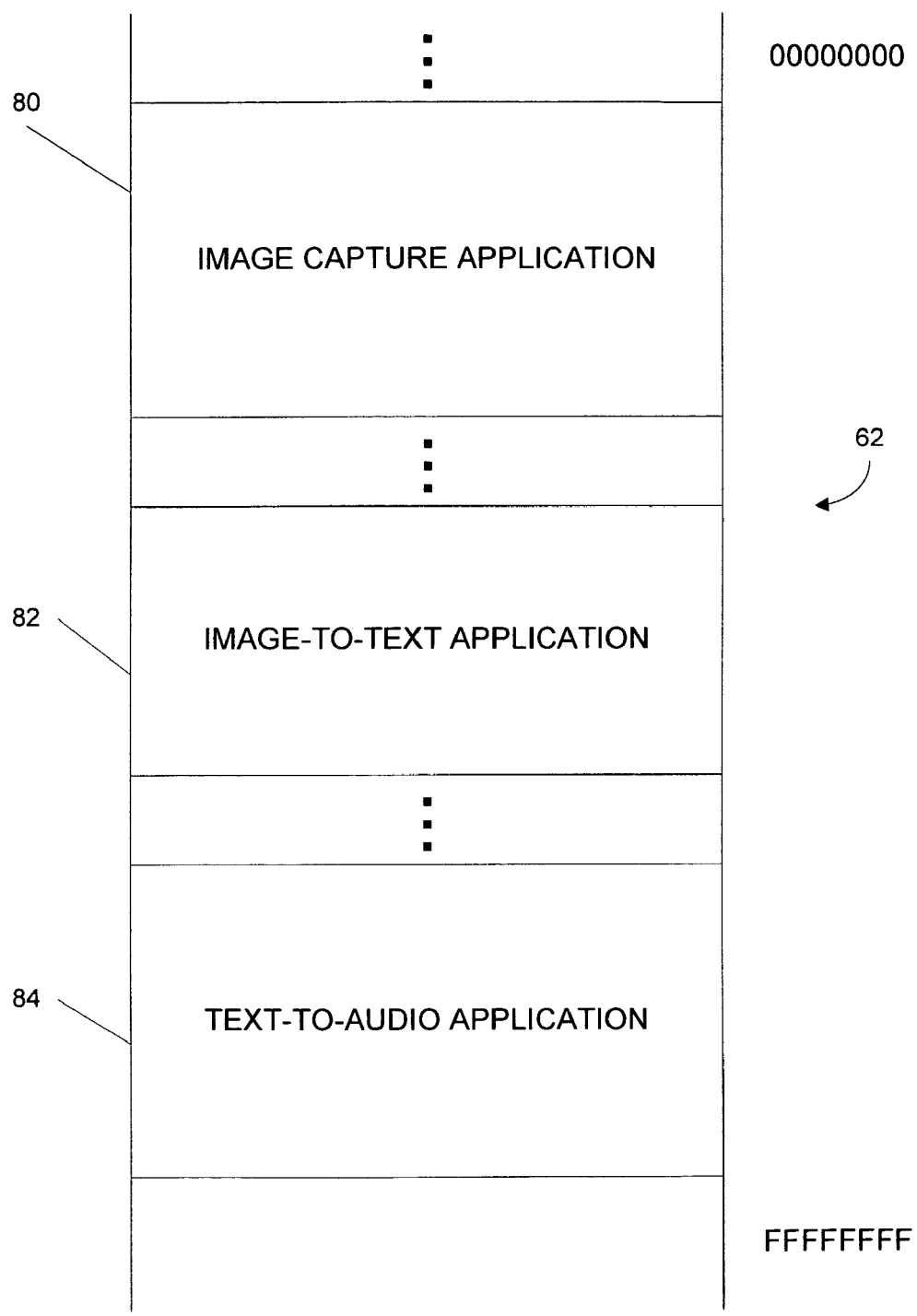
FIG. 5 is a schematic diagram illustrating software that may be stored in the memory illustrated in FIG. 4.

FIG. 5 illustrates possible contents of the memory module 62 or a portion thereof. In some embodiments, the memory module 62 contains software. The software, as illustrated in FIG. 5, may include three programs: an image capture application 80, an image-to-text application 82, and a text-to-audio application 84. In various implementations, the software may be configured in such a way that it does not include three distinct portions. Functional features could also be combined in a variety of ways. However, in at least some embodiments, the image capture application 80 includes instructions for operating the scanning mechanism 30 and obtaining image data. The image-to-text application 82 may include instructions for converting image data into text-based data. Similarly, the image-to-text application 82 may include instructions for performing optical character recognition ("OCR") on the image data to analyze the image data and recognize characters. The text-to-audio application 84 may include instructions for taking the text data generated by the image-to-text application 82 and generating corresponding speech or audio data. In some embodiments, the user may be required to select a language for the document in order to successfully execute these applications. Both OCR applications and text-to-audio applications are well known in the art and are therefore not described.

It should be understood that the memory module 62 is not limited to the components listed and may contains other applications and data used to support the scanners 18. Software used in devices such as the scanners 18 to carry out basic operations such as scanning, printing, and faxing is well known and, therefore, also not described.

Figure 6:
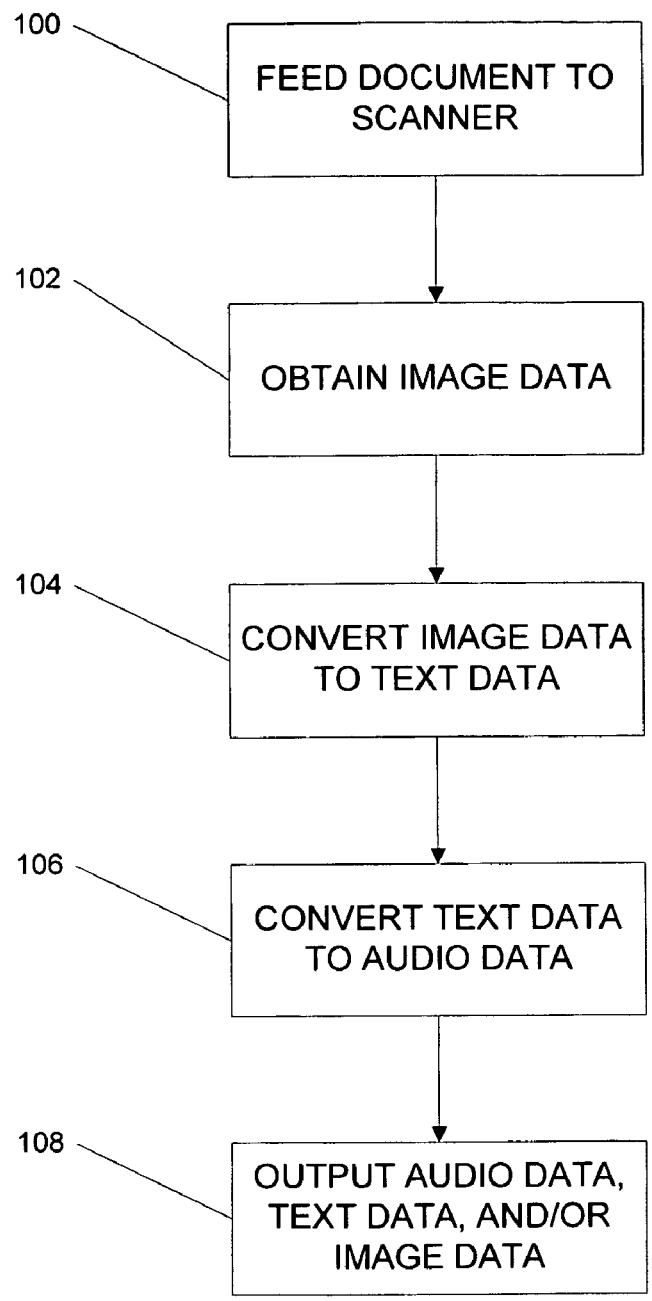
FIG. 6 is a flow chart describing an exemplary process generating audio data from printed media.

FIG. 6 illustrates a flow chart that describes an exemplary process of generating audio data from printed media such as a document. The process or method presented in FIG. 6 may be executed by the processor 60 executing instructions from the image capture application 80, the image-to-text application 82, and/or the text-to-audio application 84, among other applications.

At block 100, the processor 60 begins by feeding a document into the scanner 18 and into a scanning position. When using a flatbed scanner, the processor 60 may skip this step since a user manually places the document in a scanning position. After the document is in a scanning position, the processor 60 initiates a scan of the document and obtains image data regarding the document at block 102. The processor 60 may initiate a scan of the document by instructing the motors 29 to rotate the feedrollers 26 and 28 and move the document past the scanning mechanism 30 or by instructing the motor 48 to move the scanning mechanism 30 past the document. After the automated movement of the printed media or the scanning mechanism 30, or any combination thereof, the processor 60 generates image data of the document. The image data may be in a portable document format ("PDF"), a joint photographic experts group ("JPEG") format, or the like.

After the processor 60 has the image data, it converts the image data to text data (block 104). As previously described, the processor 60 may execute the image-to-text application 82 and use OCR to generate text data from the image data. The text data may be created in any number of formats, such as a plain text document encoded using American Standard Code for Information Interchange ("ASCII") format or another encoding such as Unicode. Other possible text formats include Extensible Markup Language (XML), a rich text document, a text document formatted to a specific word-processing application, or the like. During this conversion, the processor 60 may also execute an application that examines the image data and automatically detects the language of the document. Such applications are known in the art and are thus not described here.

After generating text data, the processor 60 converts the text data to audio data (block 106). As also previously described, the processor 60 may execute the text-to-audio application 84 to perform this step. The audio data generated may be in a Moving Pictures Experts Group Layer-3 Audio ("MP3") format, a Windows® Media Audio ("WMA") format, or the like.

At block 108, the processor 60, using the I/O module 68, the memory module 62, the printer components 64, the speaker 66, or any combination thereof, may output or transmit the image data, the text data, and/or the audio data to a target device or internal output mechanism. For example, the processor 60 may send an audio signal to the speaker 66 to output the audio data to the user who initiated the scan. The processor 60 may also instruct the I/O module 68 to output the audio data through a modem by dialing a phone number and then playing the audio data through the modem upon detecting a receiver pickup signal. The processor 60 may also instruct the printer components 64 to print a hardcopy of the image data and/or text data. The text data may include all the recognized characters of the image data but may exclude any graphical images or unrecognizable characters or images. The processor 60 may further instruct the I/O module 68 to output the image data, text data, and/or audio data to a connected device. The connected device, connected either directly or indirectly through the network 19, may receive the image data, text data, and/or audio data and may view, edit, store, play, or otherwise manipulate the received data. In some embodiments, the processor 60 may also instruct the memory module 62 to store the image data, text data, and/or audio data so that it can be retrieved later for printing, transmitting, or playing. Other embodiments may output the audio data using other means; for example, the I/O module 68 may transmit the audio data to another device as part of one or more email messages. The audio data may also be written to a removable storage medium through the I/O module 68. For example, an MP3 file might be written to a Secure Digital flash memory card for later playback on a portable device. Similarly, audio data might be recorded to a compact disc using the audio "Red Book" format, allowing a standard compact disc player to play the document.

It should be noted that the processor 60 may execute additional intermediary, preparatory, and terminating steps in addition to the steps described above to generate audio data from printed media. It should also be understood that the processor 60 may be configured to directly create text data upon scanning the document without first creating image data. The processor 60 may also directly create audio data from the obtained image data or directly upon scanning the document and may not create intermediary data formats. Such an implementation matches a pixel representation of a word directly into its audio equivalent. A mechanism such as a general lookup table can be used to facilitate such a conversion process. In some languages, such as Chinese, the conversion from image directly into audio data can be advantageous because each Chinese character has one unique pronunciation.

It should also be noted that the scanners 18a and 18b may utilize various segmentation and serialization functions in the above-described method to divide and order the text data before creating corresponding audio data. Image or text data may carry information in two dimensions (e.g., down and across a page) while common formats of audio data carry information in one direction. The scanners 18a and 18b, therefore, may serialize two dimensional text data into one dimensional audio data. For one-column text documents, serialization can be done relatively easily from left to right for each line of text down the length of the document. However, for documents containing multiple columns, such as magazine articles, serialization that retains the correct flow of the document may require additional processing.

The scanners 18a and 18b may utilize an automatic segmentation and serialization method to establish text data flow before creating corresponding audio data. The automatic segmentation and serialization method may automatically segment a document into sections based on the spatial arrangement or layout of the document. One automatic segmentation approach is to use cluster techniques. Cluster techniques check the relative distances of pixels to determine clusters on the document. Image segmentation techniques are well known in the art and are, therefore, not discussed in detail.

After dividing the document into segments, the generated segments may be ordered based on content flow rules. For example, the flow rules may specify that segments be ordered top to bottom and then left to right. The flow rules may also be based on segment characteristics. For example, the font and/or size of the characters of the segments may be used to order segments. Titles and labels such as "FIG. 1" and "Table 1" may also be used to locate non-text segments such as images, tables, charts, graphs, etc., that should be disregarded or skipped when creating the corresponding audio data. Segments may also be experimentally ordered in a variety of sequences and each sequence may be analyzed to determine the correct sequence. The correct or preferred sequence may be the sequence with the fewest spelling and/or grammatical errors. Rules may be pre-installed and applied automatically or as chosen by a user or may be entered individually for each scan as needed by the user.

Once a preferred sequence is generated, the scanners 18a and 18b generate audio data from the established segments following the preferred constructed sequence.

Figure 7:
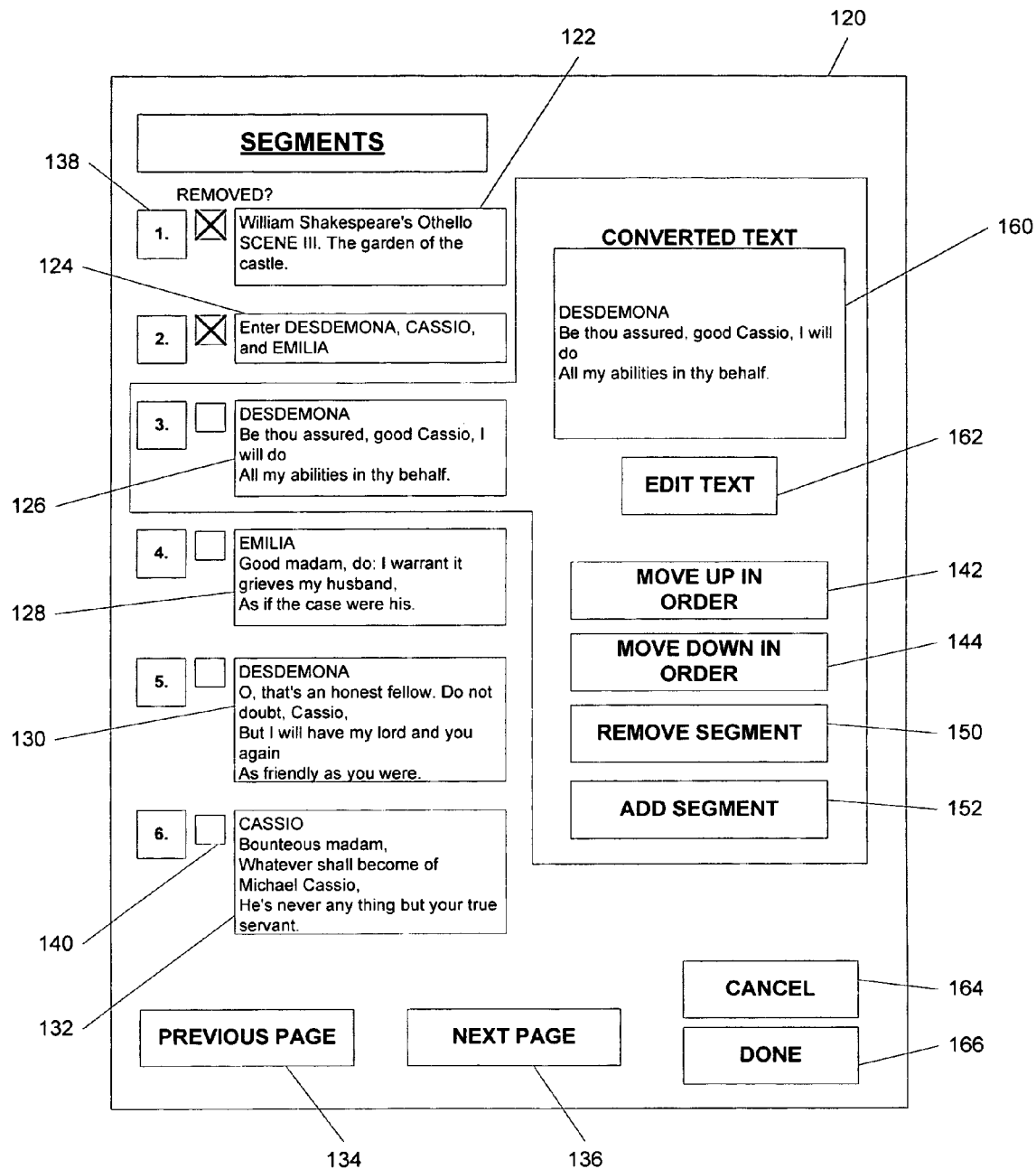
FIG. 7 illustrates an exemplary user interface used to specify a text segment sequence.

The scanners 18a and 18b may also utilize a semi-automatic method of segmenting and serializing. Using image segmentation algorithms, such as described for the automatic method above, segments are created and displayed to a user. The user then orders the displayed segments manually. FIG. 7 illustrates an exemplary user interface 120 that may be displayed on a display of the scanners 18a and 18b, such as a touchscreen, or a connected device, such as the workstation 12. The user interface 120 lists six text segments 122, 124, 126, 128, 130, and 132. If more text segments are generated from the image data than can be displayed on the user interface 120, a user may use a previous page button 134 or a next page button 136 to display the preceding or remaining segments. Depending upon the implementation, the text segments 122, 124, 126, 128, 130, and 132 may be displayed using the image data corresponding to each text segment or using the corresponding text data.

Each text segment is associated with a segment number 138 and a removal indicator 140. The segment number 138 indicates the order of the segments. The segments 122, 124, 126, 128, 130, and 132 may be initially displayed in a random order or may be displayed in a default sequence based on content flow rules as described above. Using the user interface 120, the user can select one of the displayed text segments 122, 124, 126, 128, 130 or 132 and can change the placement of the text segment in the sequence of segments using a move-up-in-order button 142 and a move-down-in-order button 144. Each activation of the move-up-in-order button 142 swaps the selected text segment with the preceding text segment, and may also update the segment number 138. Similarly, each activation of the move-down-in-order button 144 will swap the selected text segment with the next text segment, and may update the segment numbers 138.

After selecting a text segment the user can also remove and add the selected text segment from the sequence using a remove-segment button 150 and an add-segment button 152 respectively. The removal indicator 140 designates whether a segment was removed from the sequence and should be disregarded or ignored when creating corresponding audio data. The removal indicators 140 associated with the first and second text segments 122 and 124 are marked with an "X" indicating that those text segments should not be referred to when creating the corresponding audio data. The user may also be able to check and uncheck the removal indicator 140 directly, and ultimately remove and/or add a text segment, by selecting it or clicking on it with the mouse 16 or other cursor control mechanism. Removed segments may also be removed from the user interface 120 entirely. Removing segments may also automatically change the segment numbers 138 associated with each text segment.

The user interface 120 may also display the corresponding text data generated with OCR for each text segment in a converted text box 160. The user can verify that the image data was adequately converted to text data and can edit the text data as needed using an edit text button 162. In embodiments that support more than one language, this function may also allow the user to change the spoken language for the selected text segment.

The user interface 120 may also include a cancel button 164 that may cancel the entire text-to-audio conversion. Selecting the cancel button 164 may also cancel any sequence and segment changes made by the user and may return the segments to their original default order. To accept the manual changes, the user may select a done button 166 that causes the scanners 18a and 18b to generate audio data from the selected segments following the manually requested sequence.

Figure 8:
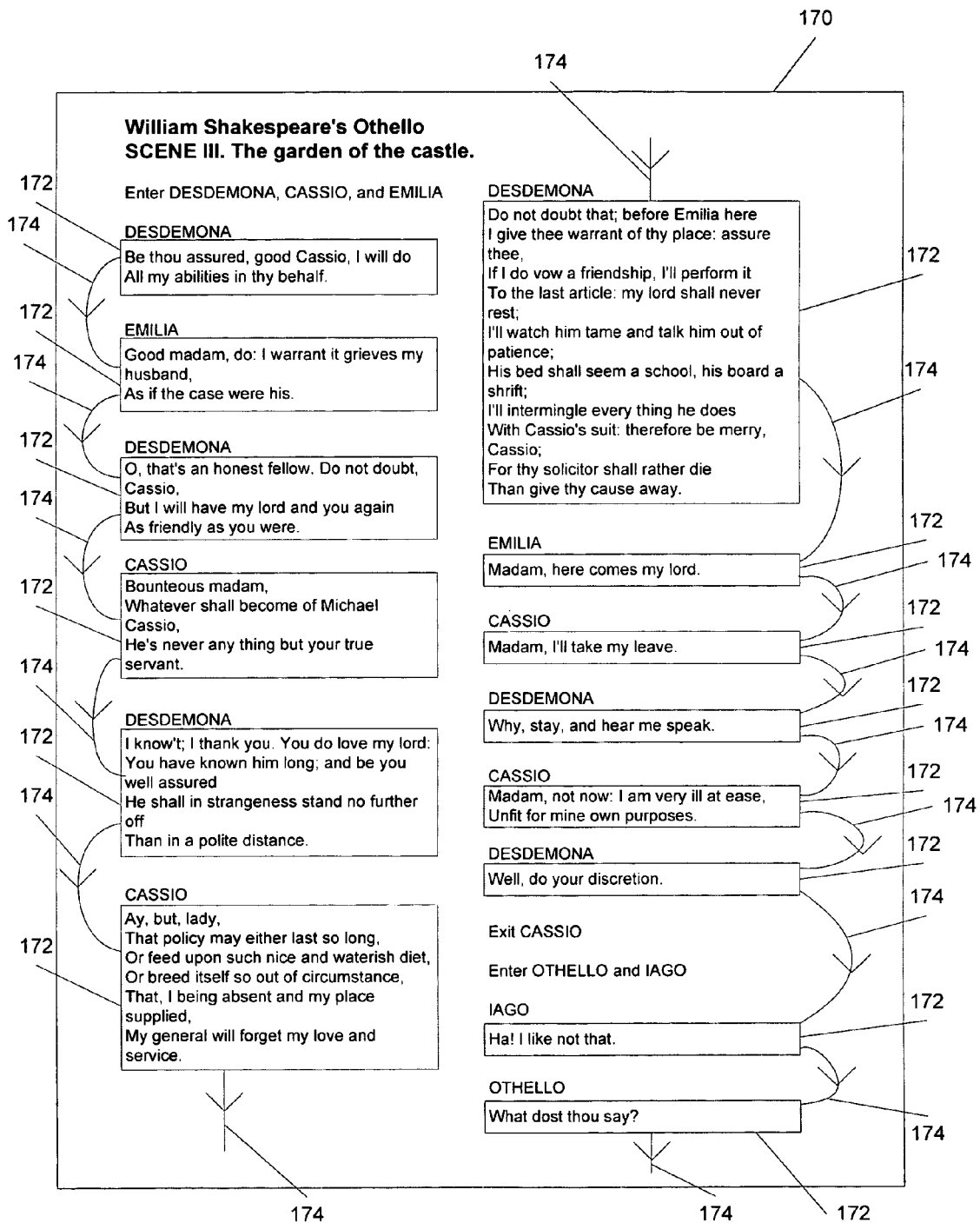
FIG. 8 illustrates a document containing exemplary segment identifiers and connection lines.

Alternatively, the scanners 18a and 18b may utilize a manual method of segmenting and serializing a document. The manual method divides and orders the document based on preset identifiers placed on the hardcopy document prior to scanning. FIG. 8 illustrates an exemplary document 170 containing identified text segments 172 and connection lines 174. The segments 172 indicate text data that is to be converted into audio data upon scanning the document. Identified segments 172 may consist of one or more paragraphs, one or more sentences within a paragraph, one or more words within a sentence, heading, titles, lists, or any individual or sequential text contained in the document and may be marked with preset identifiers, which may be a background color, a bounding line, a watermark, a font size, a font color, a font style, a font effect, or the like.

The connection lines 174 link sequential segments 172 and indicate a linear ordering of segments 172. The connection lines 174 may further contain a direction arrow that specifies an order of the segments 172. Connection lines 174 may directly connect two segments 172 or may be used to indicate other types of sequence flow such as "continue to the next page" or "continue to the next column" without directly connecting two segments 172. As seen at the bottom of the first column and the top of the second column of the document 170, a connection line 174 leading from a segment 172 without connecting to an ending segment 172 indicates that the next sequential segment 172 may be found on the next column or page. Similarly, a connection line 174 ending at a segment 172 without originating from a segment 172 may indicate that the previous segment 172 is contained within a previous column or page. A segment 172 without a connection line 174 leading from it or extending to it may further indicate an ending or starting segment respectively.

The connection lines 174 may also have particular characteristics such as color, size, shape, or the like, which the scanners 18a and 18b use to distinguish the connection lines 174 from the text data of the document. Characteristics of the connection lines 174 may also be used to designate direction. For example, green connection lines may indicate a top to bottom connection flow and blue lines may indicate a bottom to top connection flow.

The characteristics of a preset segment identifier or a connection line 174 may provide additional processing instructions. For example, multiple background colors may be used as preset identifiers for the document 170 and each background color may be used to designate meaning or characteristics of the corresponding text segments. For example, the document 170 may contain parts of a script and the lines of each character may be marked in a different color. The scanners 18a and 18b may create audio data with differentiating tones or pitches to represent each character based on the different colored preset identifiers.

After initially scanning the document the scanners 18a and 18b identify segments 172 in the image data to be converted to audio data by searching for locations within the image data that include the preset identifier. For example, if the preset identifier is a specific background color, the scanners 18a and 18b may search pixel-by-pixel within the image data for a pixel that includes the matching background color (or a background color within a predefined tolerance of the matching background color). Once a matching pixel is located, that pixel becomes the beginning of a zone. The end of the zone is established by finding a first non-matching pixel that does not include the preset identifier in a contiguous stream of pixels that do include the present identifier starting from the first matching pixel. All pixels before the non-matching pixel are considered part of the zone. Once all the zones of the image data are located, the zones are checked to determine if any of the zones are within a predetermined proximity of other zones. If two zones are located within the predetermined proximity they may be combined into a single zone. Zones size may also be used to check for valid zones. Zones smaller than a predetermined size may be discarded since it is unlikely that they represent a true segment. The remaining zones of matching pixels become the segments 172 to be converted to audio data. The scanners 18a and 18b may follow a similar method to locate connection lines 174 and associate a connection line 174 to one or more corresponding segments 172.

After the scanners 18a and 18b have established the segments 172 and the connection lines 174, the scanners 18a and 18b create audio data of the text included in the segments 172 in the order specified by the connection lines 174.

It should be understood that the scanners 18a and 18b may be configured to operate according to one, all, or any combination of the above segmentation and serialization methods. A user may select a particular method for the scanner 18a or 18b to use and may change the selected method as needed. It should also be understood that steps and features of the above methods may be combined in various ways to create additional segmentation and serialization methods. For example, the manual method may be used to initially create the segments and the sequence of the segments, but before audio data is generated, the segments and sequence may be displayed to a user for additional manual manipulation as described in the semi-automatic method.

Figure 9:
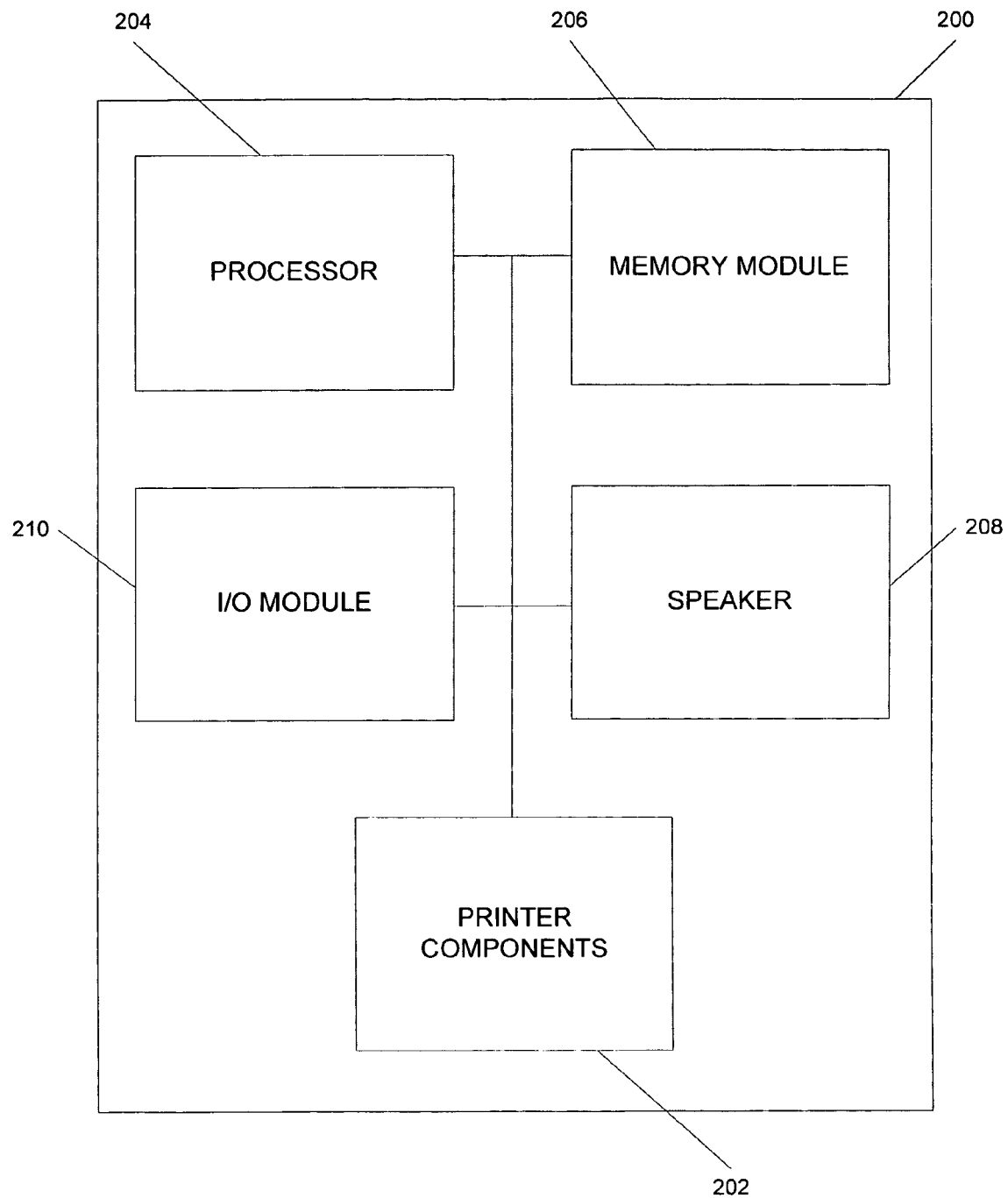
FIG. 9 is a schematic diagram of exemplary hardware inside a printer.

In some embodiments, audio data may be generated from other sources besides printed media. Printers, for example, may be configured to generate audio data from print data or commands received from a connected workstation or device. FIG. 9 illustrates exemplary hardware contained within a printer 200. Similar to the scanners 18a and 18b, the printer 200 includes printer components 202, a processor 204, a memory module 206, a speaker 208, and an I/O module 210. As described for the scanners 18a and 18b, the processor 204 may be a microprocessor, a programmable logic controller, an application specific integrated circuit, or the like. The memory module 206 may also contain non-volatile memory such as one or more forms of ROM, one or more disk drives, RAM, other memory, or combinations of the foregoing. The memory module 206 may contain program code or instructions executable by the processor 204.

Figure 10:
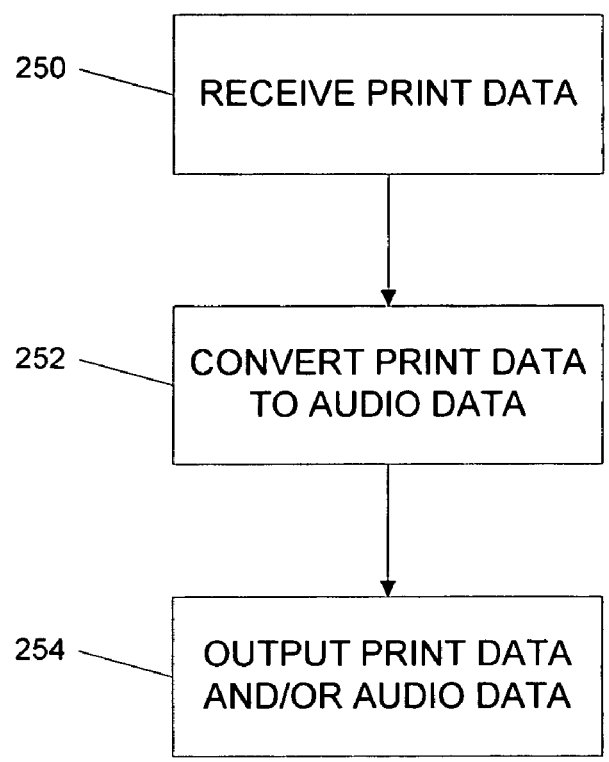
FIG. 10 is a flow chart describing an exemplary process of generating audio data from print data.

FIG. 10 illustrates a flow chart that describes an exemplary process of generating audio data from print data such as data sent to the printer 200. The process or method presented in FIG. 10 may be executed by the processor 204 executing instructions stored in the memory module 206 of the printer 200. At block 250, the processor 204 begins by receiving print data from a connected workstation 12 or similar device. The print data may be received through the I/O module 210 of the printer 200 and may include a representation of the data to render on the print media and may also include operating instructions such as to whether or not colored ink or double-sided printing should be used, whether audio data should be generated or not, and the like. The print data received by the printer 200 may be in a printer-specific format generated by a corresponding driver executing on the connected device, such as the workstation 12. The print data may also follow a widely known format such as Postscript®, Printer Command Language (PCL®), or another page description language.

After receiving the print data, the processor 204 converts the print data to audio data (block 252). The processor 204 may be configured to use similar conversion and segmentation and serialization methods as described above for the scanners 18a and 18b to convert the print data to audio data. The print data received by the printer 200 may also include segmentation and serialization instructions. The audio data generated may be in a Moving Pictures Experts Group Layer-3 Audio ("MP3") format, a Windows® Media Audio ("WMA") format, or the like.

At block 254, the processor 204, using the I/O module 210, the memory module 206, the printer components 202, or the speaker 208, may output or transmit the print data and/or the audio data to a target device or an internal output mechanism, such as the speaker 208. For example, the processor 204 may instruct the speaker 208 to output the audio data. The processor 204 may also instruct the printer components 202 to print a hardcopy of the received print data. The processor 204 may also instruct the I/O module 210 to output the print data and/or audio data to a connected device. The connected device, connected either directly or indirectly through the network 19, may receive the print data and/or audio data and may view, manipulate, store, and/or play the received data. The processor 204 may also instruct the memory module 206 to store the print data and/or audio data so that it can be retrieved later for printing, transmitting, or playing.

It should be noted the processor 204 may execute additional intermediary, preparatory, and terminating steps through the above process of generating audio data from print data.

Various features and advantages of the invention are set forth in the following claims.

What is claimed is:

1. An apparatus that generates an audio signal from an image, comprising:
    a scanning platform for supporting a document to be scanned;
    a scanning mechanism for generating computer-readable image data representative of at least a portion of said image; and
    a processor configured to convert at least a portion of said computer-readable image data into said audio signal;
    wherein said scanning platform, said scanning mechanism and said processor are part of an integrated unit, wherein said processor is additionally configured to create one or more segments within said computer-readable image data that includes a preset identifier and wherein said processor is additionally configured to identify one or more connection lines within said computer-readable image data.

2. The apparatus of claim 1, wherein said processor is additionally configured to associate each of said one or more connection lines with one of said one or more segments and to sequence said segments based at least in part on said one or more connection lines.

3. A method, using a peripheral device to convert an image to an audio signal, comprising:
    scanning said image with a scanning mechanism housed within said peripheral device;
    generating computer-readable image data based at least in part on said scanned image;
    converting said computer-readable image data to an audio signal;
    transmitting said audio signal from said peripheral device to an external device;
    determining from said computer-readable image data whether said image is a textual image; and
    automatically determining a language of said textual image if said image is a textual image;
    wherein the converting said computer-readable image data to an audio signal comprises separating said computer readable image data into a plurality of pixel representations and using a lookup table to match each of said pixel representations to an audio equivalent.

4. The method of claim 3, wherein each of said pixel representations corresponds to a letter.

5. The method of claim 3, wherein each of said pixel representations corresponds to a word.

6. The method of claim 3, wherein each of said pixel representations can correspond to either a letter or a word and the language of a text in said image determines whether each of said pixel representations corresponds to a letter or a word.

* * * * *